United States Patent
Kim

(10) Patent No.: US 8,741,452 B2
(45) Date of Patent: Jun. 3, 2014

(54) SECONDARY BATTERY

(75) Inventor: Bongyoung Kim, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 1002 days.

(21) Appl. No.: 12/643,753

(22) Filed: Dec. 21, 2009

(65) Prior Publication Data

US 2010/0159292 A1 Jun. 24, 2010

(30) Foreign Application Priority Data

Dec. 22, 2008 (KR) ........................ 10-2008-0131469

(51) Int. Cl.
*H01M 10/42* (2006.01)
*H01M 14/00* (2006.01)

(52) U.S. Cl.
CPC ................ *H01M 10/42* (2013.01); *Y02E 60/12* (2013.01); *H01M 2200/106* (2013.01); *H01M 10/425* (2013.01)
USPC .......................................................... 429/7

(58) Field of Classification Search
None
See application file for complete search history.

(56) References Cited

U.S. PATENT DOCUMENTS

2005/0181242 A1  8/2005  Suzuki et al.
2005/0208346 A1*  9/2005  Moon et al. ....................... 429/7

FOREIGN PATENT DOCUMENTS

| JP | 2002-216724 | * | 8/2002 |
| JP | 2005-317396 |   | 11/2005 |
| KR | 1020050046600 |   | 5/2005 |
| KR | 1020080038663 |   | 5/2008 |

* cited by examiner

*Primary Examiner* — Milton I Cano
*Assistant Examiner* — Sarah A Slifka
(74) *Attorney, Agent, or Firm* — Knobbe Martens Olson & Bear LLP

(57) ABSTRACT

A secondary battery is disclosed. The secondary battery includes a bare cell, a protection circuit module located on a lateral side of the bare cell, and first and second holders disposed between the bare cell and the protection circuit module. The first holder and the second holder are coupled with the protection circuit module.

27 Claims, 8 Drawing Sheets

SECONDARY BATTERY

CLAIM FOR PRIORITY

This application is based on and claims priority to Korean Patent Application No. 10-2008-0131469 filed on Dec. 22, 2008 in the Korean Intellectual Property Office (KIPO), the entire contents of which are hereby incorporated by reference.

BACKGROUND OF THE INVENTION

1. Field of the Invention

The present invention relates to a secondary battery.

2. Description of the Related Art

A lithium ion secondary battery includes a core pack having a bare cell and a protection circuit module (hereinafter, referred to as a 'PCM').

The bare cell includes a positive electrode plate, a negative electrode plate, an electrolyte, and a separator, supplies electrical energy to electronic devices, and is charged and discharged repeatedly during its lifetime. The PCM protects the secondary battery from over-charge and over-current, and prevents the secondary battery from decreasing performance due to over-discharge.

The bare cell and the PCM are assembled into a battery pack in such a way that the PCM is positioned on a side or on an upper surface of the bare cell having electrode terminals. When the PCM is positioned at a side of the bare cell, the relative placement results in a more complicated packaging. The shape of the side of the bare cell, possible interference between the side of the bare cell and devices mounted on a lower surface of the PCM, and the manner in which the PCM is coupled to the bare cell all complicate the packaging.

BRIEF SUMMARY OF THE INVENTION

Therefore, the present invention is made in view of the above problems, and the present invention provides a secondary battery to which a compatible protection circuit module is applied regardless of the kind of a bare cell.

The aspect of the present invention is not limited to the above-mentioned aspect, and those skilled in the art can clearly understand other unmentioned technical features and aspects of the present invention from the following descriptions.

In accordance with an exemplary embodiment of the present invention, there is provided a secondary battery comprising: a bare cell; a protection circuit module located on a side of the bare cell; and a first holder and a second holder located between the bare cell and the protection circuit module and coupled with the protection circuit module.

The protection circuit module comprises a first hole and a second hole formed at positions corresponding to the first holder and the second holder, respectively. The first hole is spaced apart from a first short side of the protection circuit module and the second hole is spaced apart from a second short side of the protection circuit module.

The first and second holders include first and second prominence respectively formed on the tops thereof having shapes corresponding to shapes of the first and second holes, and the first and second holes have the same depths as thicknesses of the first and second prominences, respectively.

Each of the first and second holes comprises: a first sub-hole having an open side facing a first long side of the protection circuit module; a second sub-hole having an open side facing a second long side of the protection circuit module, and corresponding to the first sub-hole; and a third sub-hole formed between the first sub-hole and the second sub-hole.

Each of the first and second prominences comprises: a first sub-prominence located to correspond to the first sub-hole and having the same cross-section as that of the first sub-hole; a second sub-prominence located to correspond to the second sub-hole and having the same cross section as that of the second sub-hole; and a third sub-prominence located to correspond to the third sub-hole and having the same cross section as that of the third sub-hole.

The first and second holes are spaced apart from a first long side and a second long side of the protection circuit module, respectively, and the first and second prominences are located to correspond to the first and second holes, respectively, and have the same cross sections as those of the first and second holes.

Bottom shapes of the first and second holders correspond to the shape of the lateral sides of the bare cell. Each of the first and second holders has a first side with a lower portion wider than an upper portion. Each of the first and second holders further comprises a supporter formed on a side thereof.

Each of the first and second holes has one of a circular shape and polygonal shape, and each of the first and second prominences has one of a circular shape and a polygonal shape.

The secondary battery further comprises a top case located on the protection circuit module to enclose the protection circuit module and the top and the bottom of the bare cell. Each of the first and second holders further include a protrusion formed on a first side thereof and the top case further includes a hole to be coupled with the protrusion.

The protection circuit module comprises first and second lead plates electrically connected to terminals on the bottoms of a first short side and a second short side of the protection circuit module. The first lead plate is electrically connected to the bottom of the bare cell and the second lead plate is electrically connected to a terminal on the top of the bare cell. The secondary battery further comprises an insulation tape disposed between the bare cell and the second lead plate.

The first holder and the second holder are press-fitted into the protection circuit module.

According to the secondary battery of the embodiment of the present invention, when the PCM is positioned at the side of the bare cell, the holder coupled to the PCM between the PCM and the bare cell is used such that the PCM can be simply coupled with the bare cell.

Due to the above-mentioned configuration, the PCM is compatible with any bare cell regardless of the kind of a bare cell so that manufacturing efficiency can be increased and a reduction of manufacturing costs can be also achieved.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Figure 1A:
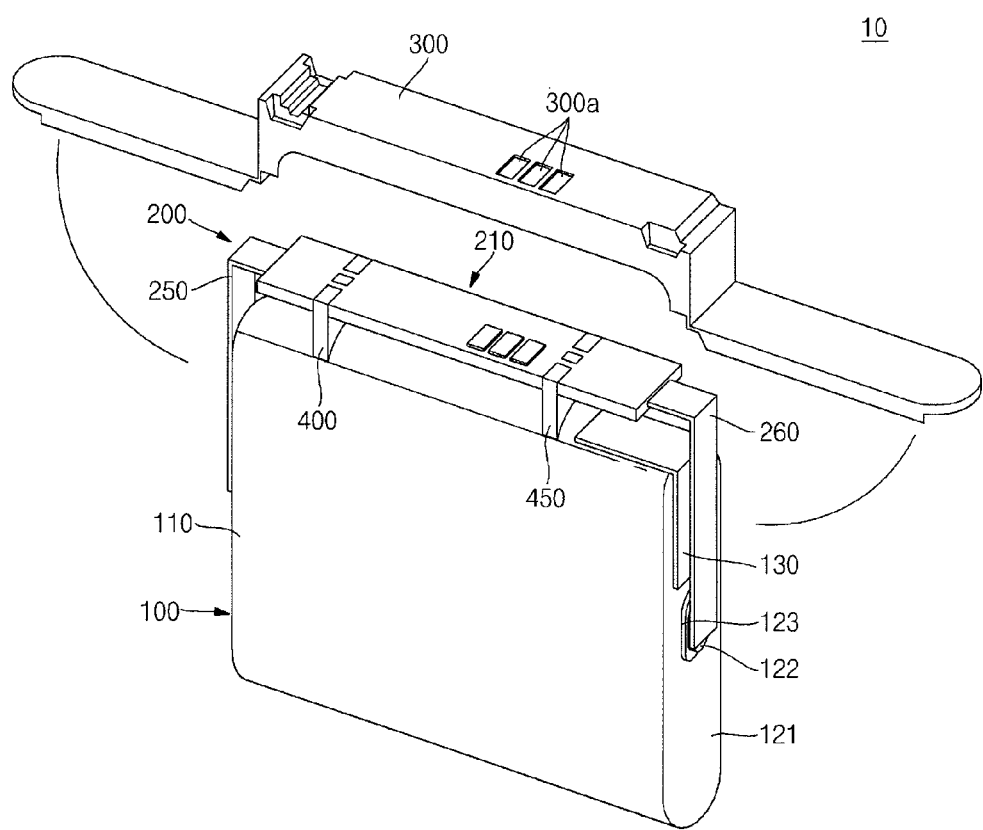
FIGS. 1A and 1B are exploded perspective views illustrating a secondary battery according to an embodiment of the present invention.

The following descriptions and the accompanying drawings include details of the following embodiments of the present invention. The features and merits of the present invention and achievements thereof will be clearly understood by the following descriptions described in detail with reference to the drawings. Same reference numerals indicate the same or like elements throughout the descriptions.

Hereinafter, a secondary battery 10 according to various embodiments of the present invention will be described in detail with reference to the accompanying drawings.

Figure 1B:
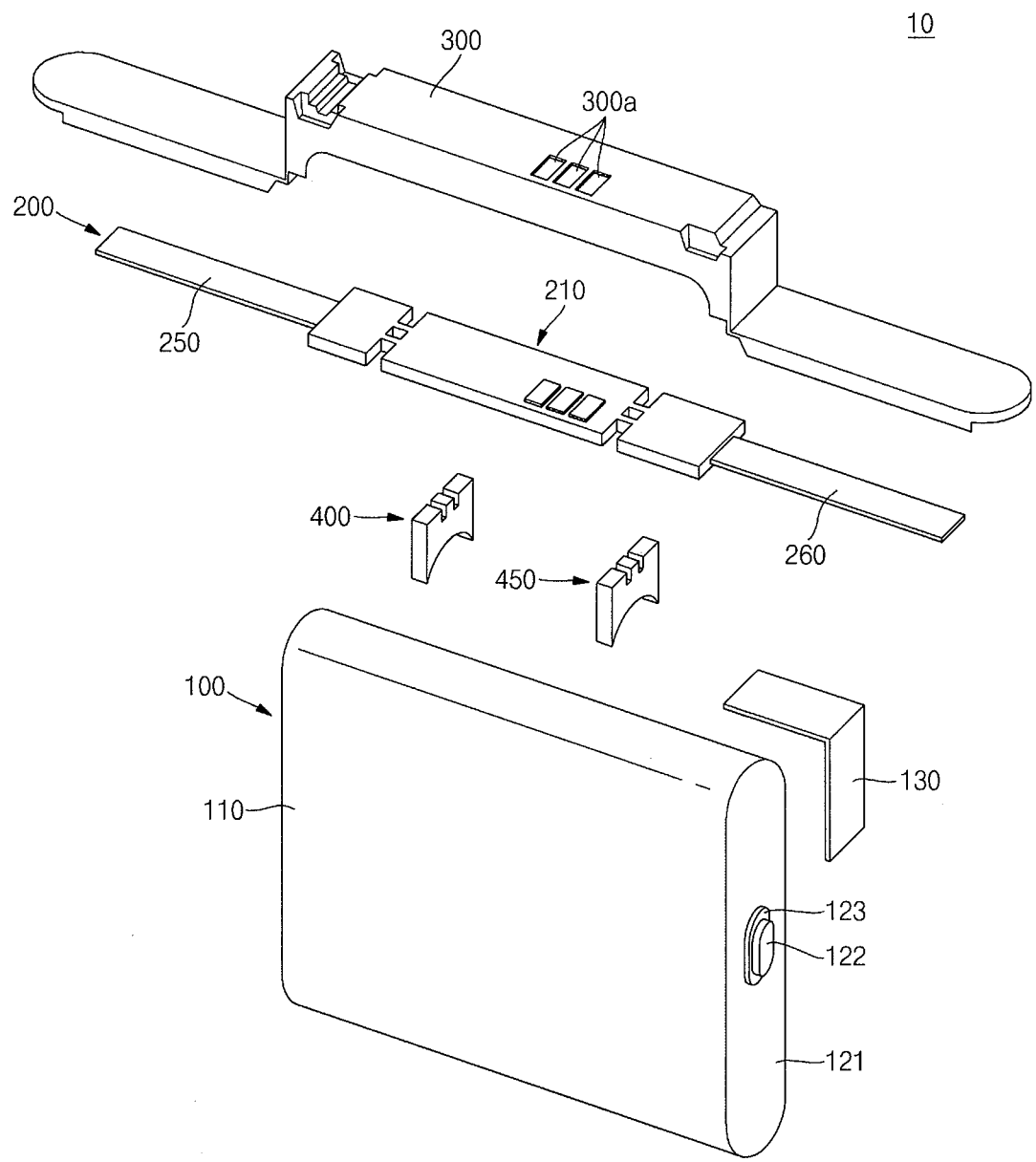
Figure 2:
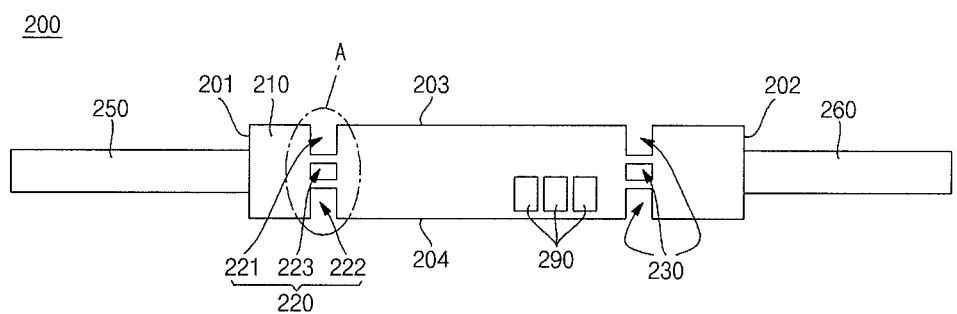
FIGS. 2 and 3 are a top view and a bottom view illustrating a protection circuit module of the secondary battery according to the embodiment of the present invention.
Figure 3:
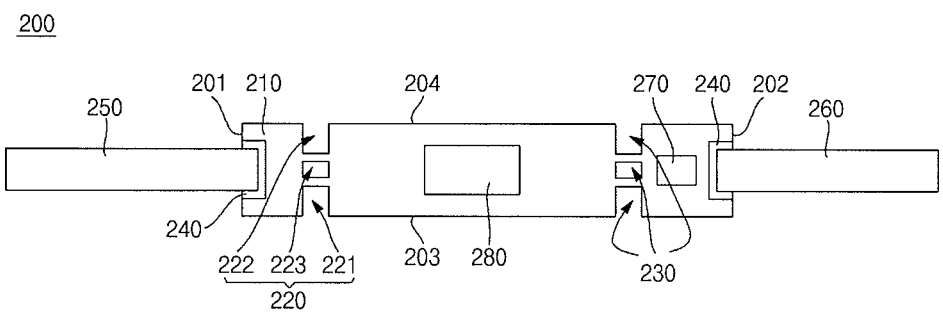
Figure 4:
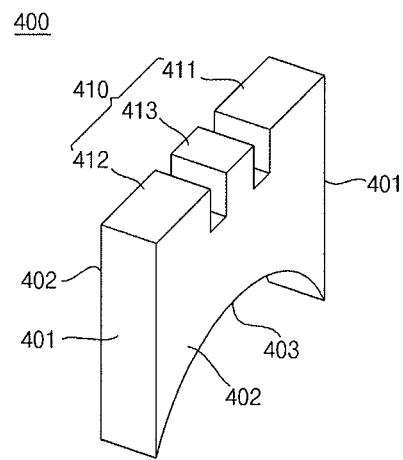
FIG. 4 is a perspective view illustrating a first holder of the secondary battery according to the embodiment of the present invention.

FIGS. 1A and 1B are exploded perspective views illustrating a secondary battery 10 according to an embodiment of the present invention. FIGS. 2 and 3 are a top view and a bottom view of a protection circuit module 200 employed in the secondary battery 10 according to the embodiment of the present invention. FIG. 4 is a perspective view illustrating a first holder 400 employed in the secondary battery 10 according to the embodiment of the present invention.

Referring to FIGS. 1 to 4, the secondary battery 10 according to the embodiment of the present invention includes a bare cell 100, a protection circuit module (PCM, hereinafter referred to as 'PCM') 200, a top case 300, a first holder 400, and a second holder 450. The first and second holders 400 and 450 are disposed between the bare cell 100 and the PCM 200 to be coupled to the PCM 200.

The bare cell 100 is made of an assembly of a can 110, an electrode assembly (not shown), and a cap assembly (not shown). The electrode assembly is accommodated in the can 110 through an opening formed on one side thereof, and the opening is sealed by the cap assembly. The bare cell 100 has a positive polarity and a negative polarity and becomes the minimal unit of the secondary battery 10 that may be charged and discharged.

The can 110 has a substantially rectangular parallelepiped shape. The can 110 has an open top and sides with curvatures. The can 110 is made of a light metal such as aluminum and functions as a positive terminal. The can 110 receives the later-described electrode assembly and electrolyte (not shown) through the open top.

The electrode assembly includes a positive electrode plate (not shown), a negative electrode plate (not shown), and a separator (not shown). The separator is disposed between a positive electrode plate and a negative electrode plate so that the electrode assembly is wound to form a jelly-roll configuration. The electrode assembly is inserted into the can 110 through the top of the can 110.

The cap assembly includes a cap plate 121, an electrode terminal 122, a gasket 123, an insulation plate (not shown), and a terminal plate (not shown). The cap assembly is coupled with the electrode assembly together with a separate insulation case (not shown) to seal the can 110. The electrode terminal 122 becomes a negative electrode terminal.

The PCM 200 includes a circuit board 210, a first hole 220, a second hole 230, terminals 240, a first lead plate 250, a second lead plate 260, a positive temperature coefficient (PTC) device 270, a protection circuit device 280, and charge/discharge terminals 290. The PCM 200 protects the secondary battery from over-charge and over-current, and also prevents inferior performance of the secondary battery from being generated due to over-discharge.

The circuit board 210 is spaced apart from one side of the bare cell 100 and is a substantially rectangular flat plate. Conductive metal patterns (not shown) are formed on an inner side of the circuit board 210 and are electrically connected to the terminals 240, the PTC device 270, the protection circuit device 280, and the charge/discharge terminals 290. The circuit board 210 may be a printed circuit board (PCB).

The first hole 220 is spaced apart from a first short side 201 of the PCM 200, and the second hole 230 is spaced apart from a second short side 202 of the PCM 200. The first and second holes 220 and 230 will be described in detail later together with the first and second holders 400 and 450.

The terminals 240 are located on the bottom, on the first short side 201, and on the second short side 202 of the circuit board 210 in the form of a flat plate. The electrode terminals 240 are electrically connected to the conductive metal pattern on the circuit board 210 and to the first and second lead plates 250 and 260.

The first lead plate 250 is located at the short side 201 of the circuit board 210 and one side of the first lead plate 260 is electrically connected to one of the terminals 240 by welding. The first lead plate 250 is bent from a bottom end of the bare cell 100, and the opposite side of the first plate 250 is electrically connected to the bottom of the can 110 by welding. The positive electrode plate of the electrode assembly is electrically connected to the cap plate 121 by welding and the can 110 is electrically connected to the cap plate 121 by welding so as to have the positive polarity. Hence, the first lead plate 250 has a positive polarity.

The second lead plate 260 is located at the second short side 202 of the board 210, and one side of the second lead plate 260 is electrically connected to one of the terminals 240 by welding. The second lead plate 260 is bent from the top end of the bare cell 100, and the opposite side of the second plate 260 is electrically connected to the electrode terminal 122 by welding. The terminal 122 is electrically connected to the negative electrode plate of the electrode assembly by welding so as to have the negative polarity. Hence, the second lead plate 260 has a negative polarity. Since the can 110 and the cap plate 121 have a positive polarity, an insulation tape 130 is provided at the bending region of the second lead plate 260 so as to prevent a short circuit between the can 110 or the cap plate 121 and the second lead plate 260.

The PTC device 270 is located between the terminal 240 located at the second short side 202 of the PCM 200 and the second hole 230. The PTC device 270 is a device whose electrical resistance increases as its temperature increases, and generates a high resistance and blocks charging/discharging currents when temperature of the secondary battery 10 is abnormally high. The PTC device 270 is electrically connected to the conductive metal pattern on the board 210.

The protection circuit device 280 is located between the first and second holes 220 and 230 on the bottom surface of the board 210. The protection circuit device 280 the charging/discharging state, current, voltage, and temperature of the secondary battery and protects the secondary battery. The protection circuit device 280 and the PTC device 270 are located in the space, between a side of the bare cell 100 and the circuit board 210, maintained by the first and second holders 400 and 450. The protection circuit device 280 is electrically connected to the conductive metal pattern on the inner side of the circuit board 210.

The charge/discharge terminal 290 is located on the top surface of the board 210 and serves as an electrical path connected to an external electronic device.

The top case 300 is located above the PCM 200 and encloses the PCM 200 and the top and the bottom of the bare cell 100. Charging/discharging holes 300a are formed in the upper case 300 in correspondence with the charging/discharging terminals 290 such that the charging-discharging terminals 290 are exposed to the exterior. The top case 300 is made of plastic and protects the bare cell 100 and the PCM 200 from an external impact.

Hereinafter, relationships between the first and second holes 220 and 230 and between the first and second holders 400 and 450 will be described in detail. In the secondary battery according to the embodiment of the present invention, the configuration of the first hole 220 is identical to that of the second hole 230, and the configuration of the first holder 400 is identical to that of the second holder 450. Thus, hereinafter, only the relationship between the first and second holes 220 and 400 will be described.

The first hole 220 is formed a distance from the first short side 201 of the PCM 200. The first hole 220 includes a first sub-hole 221 having an open side facing a first long side 203 of the PCM 200, a second sub-hole 222 having an open side facing a second long side 204 of the PCM 200 and symmetrical to the first sub-hole 221, and a third sub-hole 223 formed between the first and second sub-holes 221 and 222.

The first holder 400 is located between a side of the bare cell 100 and the bottom of the PCM 200, that is, on the bottom of the first hole 220 to correspond to the first hole 220.

A first prominence 410 mating with the first hole 220 is formed on the top of the first holder 400. The first prominence 410 includes a first sub-prominence 411 corresponding to the first sub-hole 221 and having the same cross-section as that of the first sub-hole 221, a second sub-prominence 412 corresponding to the second sub-hole 222 and having the same cross-section as that of the second sub-hole 222, and a third sub-prominence 413 corresponding to the third sub-hole 223 and having the same cross-section as that of the third sub-hole 223.

The first hole 220 can have a circular or a polygonal shape and the first prominence 410 has the same circular or polygonal shape as that of the first hole 220. More particularly, the shapes of the first to third sub-holes 221, 222, and 223 may be circular or polygonal and the first to third sub-prominences 411, 412, and 413 may have the same circular or polygonal shapes as those of the first to third sub-holes 221, 222, and 223. Preferably, the first to third sub-prominences 411, 412, and 413 have rectangular cross-sections, and thus have parallel-piped shapes in three dimensions. In this case, the first hole 220 has the same depth as the thickness of the first prominence 410. More particularly, the first to third sub-holes 221, 222, and 223 have the same depth as the thickness of the first to third sub-prominences 411, 412, and 413, respectively.

The first prominence 410 is press-fitted into the first hole 220 for the coupling therebetween. The press-fit is the coupling between a shaft and a hole without a gap when the shaft is inserted in the hole, and friction between the shaft and the hole prevents the shaft from being separated from the hole. The first to third sub-prominences 411, 412, and 413 are press-fitted into the first to third sub-holes 221, 222, and 223, respectively, so that the first holder 400 is coupled with the PCM 200 and maintains the space between the bare cell 100 and the PCM 200.

The bottom 403 of the first holder 400 has a shape mating, preferably, the same shape as those of the lateral sides of the bare cell 100. In the embodiment, the bottom of the first holder 400 has the same curvature as those of the lateral sides of the bare cell 100, such that the first holder 400 is stably seated on one of the lateral sides of the bare cell 100 without a gap. A double-sided tape is attached to the bottom of the first holder 400 to be securely adhered to one of the lateral sides of the bare cell 100. First sides 401 of the first holder 400 have a rectangular shape and are parallel to wide sides of the bare cell 100, while second sides 402 of the first holder 400 are parallel to the top and the bottom of the bare cell 100.

The configurations and functions of the second hole 230 and the second holder 450 are like in the case of the first hole 220 and the first holder 400 as described above.

In the embodiment of the present invention, the secondary battery 10 is provided with an effective packing structure including holes formed in the PCM 200 and a holder having prominences to be press-fitted into the holes such that the PCM 200 is coupled with the bare cell 100. The first holder 400 and the second holder 450 are press-fitted into the PCM 200 for the secure coupling so that the coupling is not easily released an external impact. The respective bottoms of the holders 400 and 450 have the same shapes of those of the lateral sides of the bare cell 100 such that the PCM 200 is stably seated on the bare cell 100. The respective holders 400 and 450 are spaced apart from each other so that a balanced PCM 200 which is not leaned against one side thereof can be achieved.

Since the PCM and the holders seating the PCM on the bare cell must be manufactured by the kind of the bare cell when packaging the PCM on the side of the bare cell, it is difficult to standardize the manufacturing process and parts used in the process and to save manufacturing costs.

In the embodiment of the present invention, only the configurations of the holders 400 and 450 are changed or modified to mate the shape of the lateral side of the bare cell 100 while maintaining the press-fitting as the coupling between the PCM 200 and the tops of the holders. Thus, the configuration of the PCM 200 is not changed by the shape of the bare cell 100 but is compatible, resulting in a simplified manufacturing process and reduction of manufacturing costs.

The number of the holders is preferably two in the consideration of stably seating the PCM 200 on the lateral side of the bare cell 100 and the space efficiency of the circuit board 210 that must be considered because of the arrangement of a plurality of devices on the circuit board 210 of the PCM 200.

Next, a secondary battery according to another and still another embodiments of the present invention will be described.

First holders and first holes which will be described in another and still another embodiments of the present invention have configurations partially different from the first holder 400 and the first hole 220 of the secondary battery 10 according to the former embodiment of the present invention.

Hereinafter, the configurations different from those of the first holder 400 and the first hole 220 according to the former embodiment of the present invention will be described. Although only the first holders and the first holes will be described for the convenient illustrative purpose, second holders and second holes have the same configurations as those of the first holders and the first holes.

Figure 5:
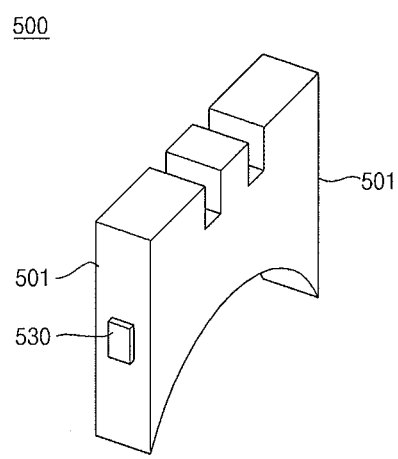
FIG. 5 is a perspective view illustrating a first holder employed in a secondary battery according to another embodiment of the present invention.
Figure 6:
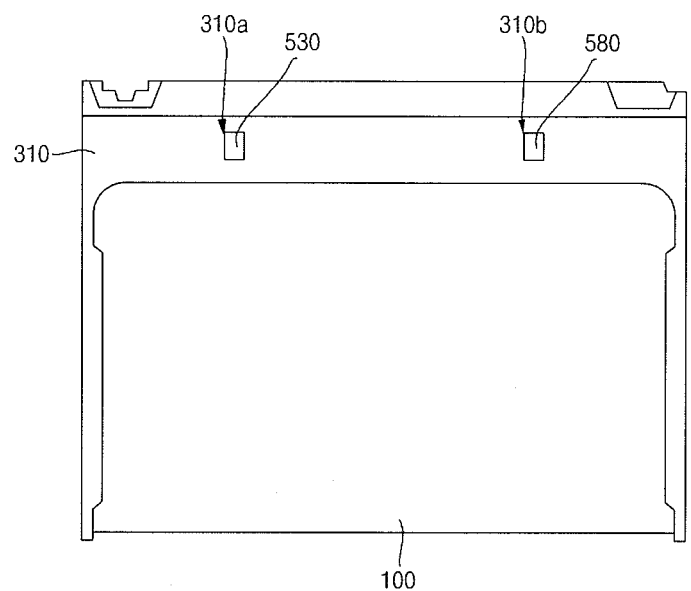
FIG. 6 is a front view illustrating the secondary battery according to another embodiment of the present invention.

FIG. 5 is a perspective view illustrating a first holder 500 of a secondary battery according to another embodiment of the present invention, and FIG. 6 is a front view illustrating the secondary battery according to another embodiment of the present invention.

Referring to FIGS. 5 and 6, a first holder 500 of a secondary battery according to another embodiment of the present invention includes rectangular protrusions 530 formed in the centers of first sides 501. The first sides 501 of the first holder 500 are surfaces parallel to wide sides of a bare cell 100, and each of two protrusions 530 is formed on each of the first sides 501 opposite to each other.

After the coupling between the bare cell 100 and the PCM 200 by the first holder 500 and a second holder (not shown), a top case 310 is located on the top of the PCM 200 to enclose the PCM 200 and the top and bottom of the bare cell 100. A hole 310a is formed in a position of the top case 310, corresponding to the protrusions 530 of the first holder 500. The number of the hole 310a is two like the number of the protrusions. The holes 310a have the same shape as those of the protrusions 530 and the protrusions 530 are press-fitted into the holes 310a, respectively. In FIG. 6, a reference numeral 580 indicates is a protrusion formed on a first side of the second holder 510 and a reference numeral 310b indicates a hole corresponding to the protrusion 580 of the second holder 510.

The protrusions 530 and 580 of the first holder 500 and the second holder are press-fitted into the holes 310a and 310b of the top case 310 respectively, such that the coupling force between the top case 310 and the core pack including the bare cell 100 and the PCM 200 is increased.

Next, still another embodiment of the present invention will be described.

Figure 7:
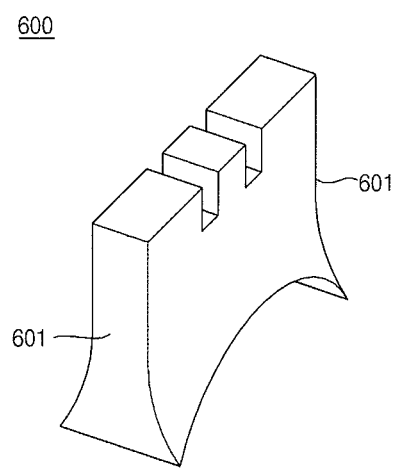
FIG. 7 is a perspective view illustrating a first holder employed in a secondary battery according to still another embodiment of the present invention.

FIG. 7 is a perspective view illustrating a first holder 600 of a secondary battery according to still another embodiment of the present invention.

Referring to FIG. 7, in the first holder 600 in accordance with still another embodiment of the present invention, a first side 601 thereof has a lower portion wider than that of an upper portion. More particularly, the first side 601 becomes gradually wide as it goes down to the lower portion.

In a case when the lower portion of the first holder 600 is wide, since the contacting area between the lower portion of the first holder 600 and the side of the bare cell is increased, the first holder 600 can support the PCM in a more stable and balanced state.

Next, still another embodiment of the present invention will be described.

Figure 8:
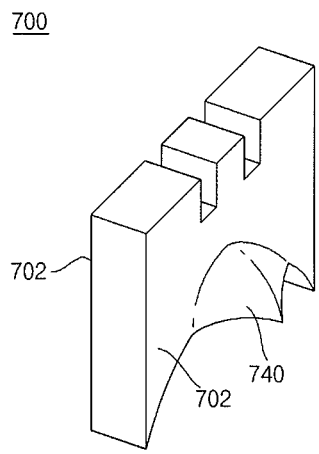
FIG. 8 is a perspective view of a first holder employed in a secondary battery according to another embodiment of the present invention.

FIG. 8 is a perspective view illustrating a first holder 700 of a secondary battery according to still another embodiment of the present invention.

Referring to FIG. 8, the first holder 700 includes supports 740 formed on second sides 702. The second sides 702 of the first holder 700 are parallel to the top or bottom of the bare cell and have respective ones of two supports 740 formed on the second sides 702 opposite to each other. The supports 740 are respectively formed on bottom centers of the second sides 702 and protrude from the respective second sides 702 to have beak-shapes ends.

The supports 740 make contact with the sides of the bare cell in the length direction of the bare cell and support the PCM in a more stable and balanced state.

Next, still another embodiment of the present invention will be described.

Figure 9:
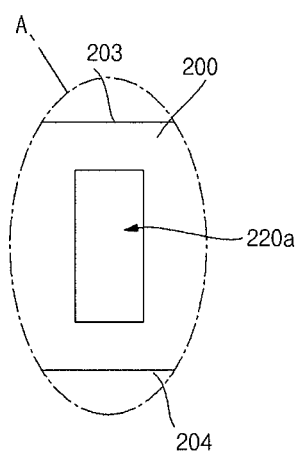
FIG. 9 is an enlarged view of a portion 'A' of a first holder employed in a secondary battery according to another embodiment of the present invention.
Figure 10:
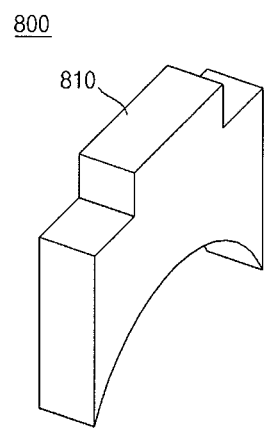
FIG. 10 is a perspective view illustrating the first holder of the secondary battery according to another embodiment of the present invention.

FIG. 9 is an enlarged view of a portion 'A' of a secondary battery according to still another embodiment of the present invention, and FIG. 10 is a perspective view illustrating a first holder 800 of the secondary battery according to still another embodiment of the present invention.

Referring to FIGS. 9 and 10, in a secondary battery according to still another embodiment of the present invention, a first hole 220a is respectively spaced apart from first and second long sides 203 and 204 of the PCM 200.

A first holder 800 is disposed between a lateral side of the bare cell and the bottom of the PCM 200 to correspond to the first hole 220a. The first holder 800 has a first prominence 810 formed on the top thereof and having the same cross-section as that of the first hole 220a.

In the first holder 800, the first prominence 810, formed on the top of the first holder 800, is a single prominence having a rectangular cross-section. The first hole 220a has the same shape and size as those of the first prominence 810 to serve as a singe hole into which the first prominence 810 is press-fitted. By the press-fitting between the first prominence 810 and the first hole 220a, the first holder 800 is coupled with the PCM 200 and maintains a gap between the bare cell and the PCM 200. In this case, the bottom of the first holder 800 has the same shape as that of the lateral side of the bare cell.

Since the coupling between the first holder 800 and the first hole 220a in the still another embodiment is more simple than the coupling between the first holder 800 and the first hole 220a in the embodiment, the press-fitting in the still another embodiment is more easily performed.

Next, still another embodiment of the present invention will be described.

Figure 11:
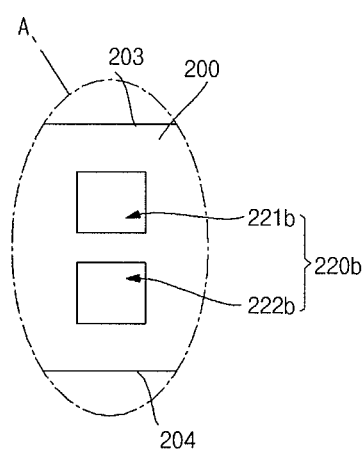
FIG. 11 is an enlarged view of a portion 'A' of a first holder employed in a secondary battery according to still another embodiment of the present invention.
Figure 12:
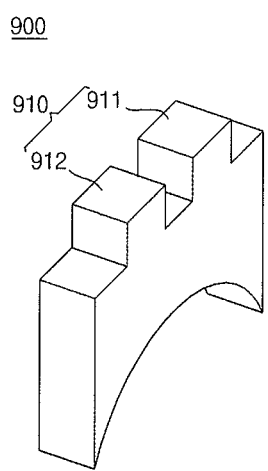
FIG. 12 is a perspective view illustrating the first holder of the secondary battery according to still another embodiment of the present invention.

FIG. 11 is an enlarged view of a portion 'A' of a secondary battery according to still another embodiment of the present invention, and FIG. 12 is a perspective view illustrating a first holder 900 of the secondary battery according to still another embodiment of the present invention.

Referring to FIGS. 11 and 12, in the secondary battery according to still another embodiment of the present invention, a first hole 220b includes a first sub-hole 221b spaced apart from a first long side 203 of the PCM 200 and a second sub-hole 222b spaced apart from a second long side 204 of the PCM 200 corresponding to the first sub-hole 221b.

A first holder 900 is disposed between a lateral side of the bare cell and the bottom of the PCM 200 and is positioned corresponding to the first hole 220b. The first holder 900 includes a first prominence 910 formed on the top of the first holder and having a shape corresponding to the shape of the first hole 220b. In more detail, the first prominence 910 includes a first sub-prominence 911 corresponding to the first sub-hole 221b, and having the same cross-section as that of the first sub-hole 221b, and a second prominence 912 corresponding to the second sub-hole 222b and having the same cross-section as that of the second sub-hole 222b.

The first and second prominences 911 and 912 have the same cross-sections as those of the first and second sub-holes 221b and 222b, respectively. Preferably, the first and second sub-prominences 911 and 912 have a rectangular cross-section and a cubic shape in three dimensions. The first hole 220b has the same depth as the thickness of the first prominence 910. In more detail, the respective depths of the first and second sub-holes 221b and 222b are equal to the thicknesses of the first and second sub-prominences 911 and 912, respectively.

The first prominence 910 is press-fitted into the first hole 220b so that the first holder 900 is coupled with the PCM 200 and a gap between the bare cell and the PCM 200 can be maintained uniform. In this case, the bottom of the first holder 900 has the same shape as that of the lateral sides of the bare cell.

Since the coupling between the first holder 900 and the first hole 220b in the still another embodiment of the present invention is more simple than that between the first holder 900 and the first hole 220b in the embodiment of the present invention, the press-fitting is more easily performed.

In accordance with the embodiments of the present invention, the secondary battery has an effective packaging structure in which the protection circuit module has the holes and the holder has the prominences to be press-fitted into the holes such that the protection circuit module is coupled with the bare cell. The first and second holders are press-fitted into the protection circuit module for secure coupling so that the coupling is not easily released by an external impact. Since the bottoms of the respective holders have the same shape as that of the lateral sides of the bare cell, the protection circuit module is stably seated on the bare cell. The respective holders are spaced apart from each other such that the protection circuit module keeps its balance without leaning against one side.

Moreover, only the lower configuration of the holders can be changed or modified to correspond to the lateral shape of the bare cell while maintaining the coupling structure between the protection circuit module and the tops of the holders. The protection circuit module is not changed or modified according to the shape of the bare cell but can be compatible. Due to this, the simplified manufacturing process and reduction of manufacturing costs can be achieved.

Although embodiments of the present invention have been described with reference to the accompanying drawings, it should be understood that many variations and modifications of the basic inventive concept herein described, which may appear to those skilled in the art, will still fall within the spirit and scope of the exemplary embodiments of the present invention as defined by the appended claims.

What is claimed is:

1. A secondary battery comprising:
a bare cell having a top and a bottom surfaces and at least one lateral side extending between the top and bottom surfaces;
a protection circuit module located adjacent the at least one lateral side of the bare cell wherein the protection circuit module includes a board that is substantially parallel to the at least one lateral side of the bare cell and holes that are formed in the board; and
a first holder and a second holder located between the bare cell and the protection circuit module and coupled with the protection circuit module wherein the first and second holders include a base member that extends substantially across the width of one of the side of the bare cell and contacts the protection circuit module and protrusions that extend out of the base member into the holes in the board in a direction that is substantially perpendicular to the plane of the board,
wherein the protection circuit module comprises first and second lead plates electrically connected to terminals on the top and bottom surfaces of the bare cell.

2. The secondary battery of claim 1, wherein the holes comprise a first hole and a second hole formed at positions corresponding to the first holder and the second holder, respectively.

3. The secondary battery of claim 2, wherein the first hole is spaced apart from a first short side of the protection circuit module and the second hole is spaced apart from a second short side of the protection circuit module.

4. The secondary battery of claim 2, wherein the first and second holders include first and second prominence respectively formed on the tops thereof having shapes corresponding to shapes of the first and second holes.

5. The secondary battery of claim 4, wherein the first and second holes have depths corresponding to thicknesses of the first and second prominences, respectively.

6. The secondary battery of claim 4, wherein each of the first and second holes comprises:
a first sub-hole having an open side facing a first long side of the protection circuit module;
a second sub-hole having an open side facing a second long side of the protection circuit module, and corresponding to the first sub-hole; and
a third sub-hole formed between the first sub-hole and the second sub-hole.

7. The secondary battery of claim 6, wherein each of the first and second prominences comprises:
a first sub-prominence located to correspond to the first sub-hole and having a shape corresponding to that of the first sub-hole;
a second sub-prominence located to correspond to the second sub-hole and having a shape corresponding to that of the second sub-hole; and
a third sub-prominence located to correspond to the third sub-hole and having a shape corresponding to that of the third sub-hole.

8. The secondary battery of claim 4, wherein each of the first and second holes comprises:
a first sub-hole spaced apart from a first long side of the protection circuit module; and
a second sub-hole spaced apart from a second long side of the protection circuit module to correspond to the first sub-hole.

9. The secondary battery of claim 8, wherein each of the first and second prominences comprises:
a first sub-prominence corresponding to the first sub-hole and having a shape corresponding to that of the first sub-hole; and
a second sub-prominence corresponding to the second sub-hole and having a shape corresponding to that of the second sub-hole.

10. The secondary battery of claim 4, wherein the protection circuit module has a first and second long sides and wherein the first and second holes are spaced apart from the first long side and the second long side of the protection circuit module, respectively.

11. The secondary battery of claim 10, wherein the first and second prominences are located to correspond to the first and second holes, respectively, and have shapes corresponding to those of the first and second holes.

12. The secondary battery of claim 1, wherein bottom shapes of the first and second holders correspond to the shape of the lateral sides of the bare cell.

13. The secondary battery of claim 1, wherein bottom shapes of the first and second holders are same as that of the lateral sides of the bare cell.

14. The secondary battery of claim 1, wherein each of the first and second holders has a first side with a lower portion wider than an upper portion.

15. The secondary battery of claim 1, wherein each of the first and second holders further comprises a supporter formed on a second side thereof.

16. The secondary battery of claim 2, wherein each of the first and second holes has one of a circular shape and a polygonal shape.

17. The secondary battery of claim 4, wherein each of the first and second prominences has one of a circular shape and a polygonal shape.

18. The secondary battery of claim 1, further comprising a top case located on the protection circuit module to enclose the protection circuit module and a top surface and a bottom surface of the bare cell.

19. The secondary battery of claim 18, wherein each of the first and second holders further include a protrusion formed on a first side thereof and the top case further includes a hole to be coupled with the protrusion.

20. The secondary battery of claim 1, wherein the first lead plate is electrically connected to a bottom surface of the bare cell and the second lead plate is electrically connected to a terminal on a top surface of the bare cell.

21. The secondary battery of claim 1, further comprising an insulation tape disposed between the bare cell and the second lead plate.

22. The secondary battery of claim 1, wherein the first holder and the second holder are press-fitted into the protection circuit module.

23. A secondary battery comprising:
a bare cell having a top and bottom surfaces and at least one lateral side extending between the top and bottom surfaces;
a protection circuit module located adjacent the at least one lateral side of the bare cell wherein the protection circuit module includes a board that is substantially parallel to the at least one lateral side of the bare cells and has a first and second opening formed therein;
a first and a second holder that is mounted on the bare cell so as to be interposed between the side of the bare cell and the protection circuit module wherein the first and second holders have a base member that extends across the width of the at least one lateral side of the bare cell and contacts the protection circuit module and outer ends that extend out of the base member that are contoured to match the contour of the first and second openings in the protection circuit module so that engagement between the ends of the first and second holders and the first and second openings retain the protection circuit module on the side of the bare cell wherein the first and second holders include protrusions that extend into the first and second openings in the board in a direction that is substantially perpendicular to the plane of the board,
wherein the protection circuit module comprises first and second lead plates electrically connected to terminals on the top and bottom surfaces of the bare cells.

24. The battery of claim 23, wherein the first and second openings comprise a plurality of sub-holes arranged in a pattern and wherein the ends of the first and second holders have protrusions that match the pattern of the first and second sub-holes.

25. The battery of claim 24, wherein the first and second opening comprise three sub-holes arranged in a line across the width of the protection circuit module and wherein the ends of the first and second holders comprise three protrusions arranged in a line.

26. The secondary battery of claim 23, further comprising a top case located on the protection circuit module to enclose the protection circuit module and the top and bottom surfaces of the bare cell.

27. The secondary battery of claim 26, wherein each of the first and second holders further includes a protrusion formed thereon and the top case further includes a hole to couple with the protrusion so as to retain the top case on the protection circuit module.

* * * * *